Patented Feb. 6, 1951

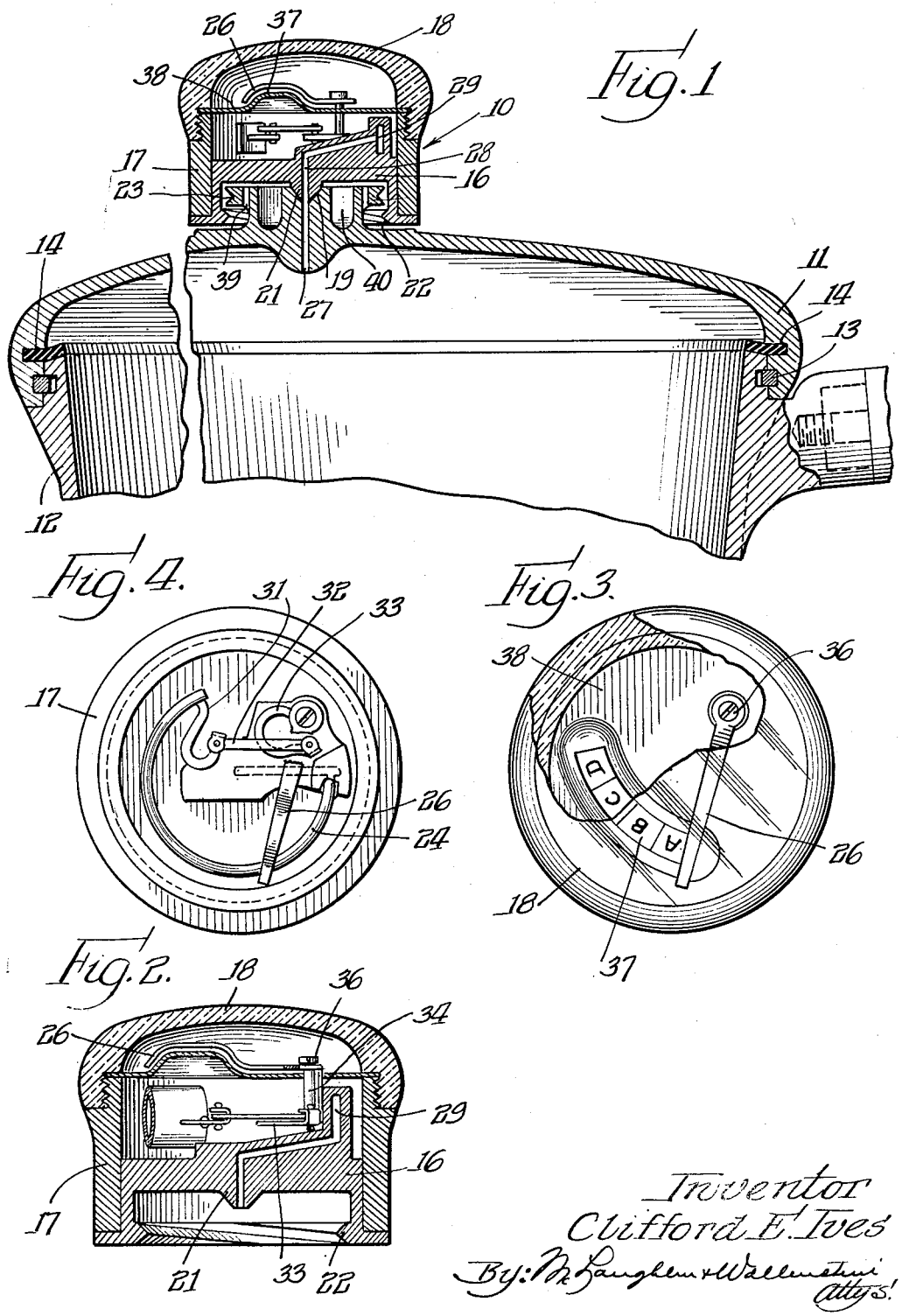

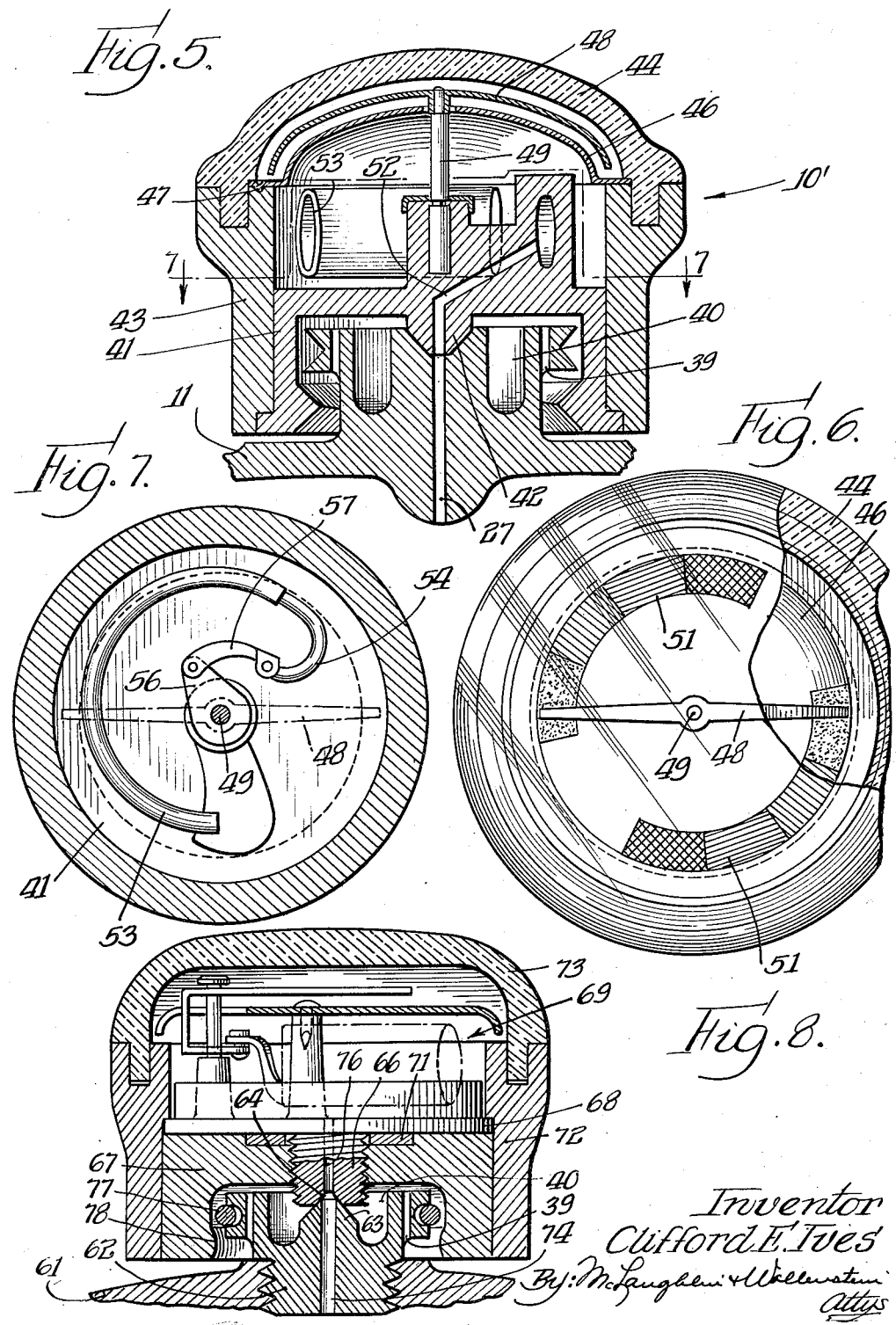

2,540,583

UNITED STATES PATENT OFFICE 2,540,583

RELIEF VALVE

Clifford E. Ives, Chicago, Ill., assignor to National Aluminum Manufacturing Co., Peoria, Ill.

Application March 10, 1944, Serial No. 525,848

1 Claim. (Cl. 137—53)

My invention relates in general to pressure cookers, and more particularly to a pressure relief and pressure indicating valve combination particularly adapted for use with pressure cookers.

Pressure cookers of the general type used in the home or kitchen are required to be relatively light and relatively simple devices capable of being used by the ordinary housewife without special training or understanding of the factors involved in the design and operation of the equipment. A common type of pressure cooker comprises a more or less standard type of pot or pan equipped with a cover capable of forming a seal with the pot so that a vapor pressure of several pounds may be generated therein. It is desirable that the housewife be able to determine by inspection the relative pressure within the cooker, and it is, moreover, essential that means be provided for the relief of pressure both in an automatic manner and at the will of the operator. An automatic relief of pressure is necessary for safety purposes while a controllable pressure relief device is important so that when a cooking interval has expired the pressure may be quickly brought back to atmospheric pressure and the contents of the pressure cooker removed.

It is the purpose of my invention to provide an improved pressure cooker equipped with a single valve combination capable by itself of satisfying all of the valve requirements of a pressure cooker, and capable also of serving as a handle for the safe removal of the cover.

In accomplishing the objects of my invention I have produced a simple, inexpensive, but highly satisfactory combination of the type referred to herein, and the many difficulties, disadvantages and imperfections of prior art pressure cookers and pressure cooker valve combinations have been obviated.

Many of the details, and more specific objects, of my invention will be clear from a consideration of the following detailed description taken with the accompanying drawings wherein:

Fig. 1 is a fragmentary vertical sectional view taken through a pressure cooker equipped with a combination pressure relief and pressure indicating device constructed in accordance with the features of my invention;

Fig. 2 is a vertical sectional view of the pressure relief and pressure indicating device removed from the cover of the pressure cooker;

Fig. 3 is a plan view thereof, with parts broken away to show structure;

Fig. 4 is a similar plan view with the cap removed, and with some of the parts, including the dial, broken away to show the construction of the indicating gauge operating mechanism;

Fig. 5 is a fragmentary vertical sectional view showing a modification;

Fig. 6 is a plan view thereof, with parts broken away to show structure and conserve space;

Fig. 7 is a plan sectional view taken on the line 7—7 of Fig. 5 showing a modified construction of the indicating gauge operating mechanism; and Fig. 8 is a vertical sectional view showing still another modification.

Referring now first to Figs. 1 to 4, inclusive, the combination pressure relief and pressure indicating device 10 is releasably attached to a cover 11 mounted on a pot or pan 12. In the form shown, the pot and cover have oppositely disposed grooves in which a locking ring 13 is operable by suitable means to lock the cover in position on the pot. My copending application, Serial No. 512,420, filed December 1, 1943, which issued as Patent No. 2,414,529 on January 21, 1947, discloses one desirable method for sealing the pot and cover by locking in position a ring similar to that shown. A sealing ring 14, also functioning in the general manner described in my copending application, is carried by the cover and is effective to seal the pot against loss of pressure so long as the cover is locked in position by the locking ring.

The pressure relief and pressure indicating device 10 comprises a frame and weight forming portion 16, preferably made of suitable metal. The portion 16 cooperates with a housing portion 17 and housing cap 18 to house the apparatus comprising the pressure gauge. The cover 11 is finished to receive the device 10, preferably at its center, and to provide a seat 19 for a valve 21, the valve 21 comprising in essence an inverted cone, and the seat 19 comprising a cone shaped seat therefor. The lower portion of the frame 16 is provided with an inwardly extending annular flange 22 adapted to be engaged under an annular flange 23 carried by the cover. In a preferred form of the invention, both the flange 22 and the flange 23 are threaded so that the device 10 may be quickly applied to or removed from the cover, but after being applied may function as a handle or knob for the purpose of lifting the cover. While the number and character of the threads may vary, I prefer to provide a single quadruple thread on the flanges 22 and 23, or more particularly a quarter of a quadruple thread, the purpose being to apply the device 10 after only a quarter of a turn, and to make it possible to engage the threads to apply or remove the device 10 at four different circumferential positions. Those skilled in the art will understand that the construction of the attaching means between the device 10 and cover 11 may vary greatly so long as the device 10 may be applied in the general manner indicated and after application utilized for the handling of the cover. This arrangement has still other advantages, some of which will be pointed out as the description proceeds.

The gauge or pressure indicating mechanism is shown as comprising a Bourdon tube 24 operable in response to pressure within the pot to control the position of a pointer 26. In order to connect the Bourdon tube to the source of pressure within the pot, the cover is provided with an orifice 27 leading to the center of the valve seat, and the valve 21 and frame 16 are provided with an orifice 28 leading to a slot 29. The open end of the Bourdon tube 24 is suitably secured as by soldering in the slot 29.

An arm 31 is secured to the free end of the Bourdon tube and is pivoted to a link 32, the opposite end of the link 32 being pivoted to an arm 33 secured to the pointer 26 through an integral upright portion. The pointer 26 and arm 33 are rotatably secured to an upright pin 34 by a screw 36 so that the pointer 26 may be moved about a pivot comprising the axis of screw 36, and be caused to traverse an arcuate raised calibrated strip 37. The arm 31 as well as the arm 33 can be bent to control the operation of the gauge, and both the construction and adjustment of gauges, including such arms, are known in the art. Generally speaking, the arm 31 may be bent to control the position which the pointer 26 occupies at any particular pressure value, and the arm 33 may be bent to control the amount of deflection obtained.

The calibrated strip 37 is raised above the remaining surface of a dial member 38 which is secured between the housing portion 17 and housing cap 18. Preferably the housing cap is formed of transparent plastic and the housing portion 17 formed of opaque plastic, although other materials may be employed consistent with the functions intended to be performed. The housing cap 18 should be transparent so that the calibrated strip 37 and pointer 26 may be seen readily, and preferably from a distance. It will be noted that the pointer 26 follows the general contour of the raised calibrated strip 37, and both the strip 37 and pointer are entirely within the transparent portion of the housing and may therefore be seen and the pressure read from almost any direction. The housing cap 18 may be secured in position by any suitable mechanical structure and in the drawing I indicate a thread attachment as one simple form of structure which may be used.

The entire structure comprising the device 10 functions as a relief valve in that its entire weight is effective to hold the cone portion of the valve 21 on the seat 19. When a predetermined pressure is exceeded, however, the valve will be forced away from its seat and vapor may escape through the orifice 27 and around the bottom edge of the device 10. To facilitate escape of vapor under pressure a plurality of vertically disposed orifices 39 are provided in the annular projection 23. These orifices may be formed in the manner shown close enough to the inner limit of the flange 23 so that they partly extend into the metal below such flange. The exact arrangement may depend somewhat upon the design, it being merely sufficient to provide free passage of vapor after it has passed through the orifice 27. It will be noted that while some of this vapor will pass around the outside of the flange 23, there will be a tendency for this path to be blocked if the device 10 is raised sufficiently to cause the flange 22 to bear against the underside of flange 23. It should be noted, also, that whatever the pressures involved, the device 10 will not be blown entirely from the cover, nor fall from the cover if the cover should be turned upside down. Between the orifices 39 and valve seat 19 is an annular recess 40, the function of which will later be described.

The combination pressure relief valve and pressure indicator 10 is formed separate from the cover but adapted to cooperate with the cover of the pressure cooker to form a completely operable combination. The cover may be finished in a single piece as shown, or the valve seat and flange for securing the device 10 in position may be separately formed and applied to the cover. As previously noted, the frame portion 16 may suitably be formed of metal, and preferably a metal such as brass, bronze, aluminum alloy, or the like, capable itself of resisting corrosion, or a ferrous or other alloy which will not normally withstand corrosion but which can be treated to produce a corrosion resisting surface. The housing portion 17 is separately formed of heat insulating material and either pressed onto the frame portion 16 or otherwise secured in position. The frame may take various forms, but preferably a portion of the frame cooperates with the housing portion 17 and housing cap 18 to completely enclose the pressure indicating or gauge portion of the apparatus. The parts are controlled as to weight and size to predetermine the pressure at which the valve 21 will be raised from its seat. Those skilled in the art will understand that given a predetermined or standard size of seat 19, the pressure may be predetermined by controlling the weight of the entire device 10. The converse is true, also, and the pop-off pressure may be predetermined by controlling the size of the valve and seat, and maintaining the weight of the device itself constant. The calibrated strip 37 may be graduated arbitrarily in several different colors, or in any other suitable way, so that it will merely have the effect of indicating a relative point between the two extremes, namely, one in which there is substantially no pressure within the pressure cooker, and the other at which the pressure within the pressure cooker approaches the blow-off or relief point. Figures indicating the actual pressure may be used if desired.

In operation, the device 10 being placed in position, and the pot supplied with water, and the cover locked in position, heat is applied and controlled to maintain the pointer 26 at an intermediate position. When the requisite cooking time has passed, the pressure cooker is removed from the source of heat and the device 10 lifted to release the pressure within the pot, thereby terminating the cooking interval, and permitting the safe removal of the cover. In the event the pressure should be allowed to rise too high during the heating period the entire device 10 will be lifted automatically by steam pressure, thus allowing escape of steam until a safe pressure is again attained. The parts are so constructed and arranged that the valve 21 can never entirely escape from the recess comprising the seat 19, and at any time when the pressure has dropped to a safe minimum, the valve will always again engage the seat and register the two orifices 27 and 28.

The device shown in Figs. 5 to 7, inclusive, differs from the previously described device only in details. The cover 11 is constructed the same as the cover 11 of Fig. 1, and the parts thereof are given the same reference characters. The combination pressure relief and indicating device 10' has a frame 41 with conical valve 42, housing portion 43 and housing cap 44, the latter formed of transparent material. A dial 46 is secured between the housing cap 44 and housing portion 43, the former being merely pressed onto the latter with the tongue and groove arrangement shown. A key 47 engages the edge of the dial 46 and presses such edge into a small recess provided on the upper rim of the housing portion 43, the result being to anchor the dial in position and prevent its turning. A double ended pointer 48 is carried on an upstanding shaft 49 extending through the center of the dial, and the double ended pointer is adapted to cooperate with calibrated strips 51 on the upper surface of the dial 46.

An orifice 52 communicating with the orifice 27 of the cover leads to the interior of a Bourdon tube 53 and the expansion and contraction of the Bourdon tube 53 in response to pressure changes, controls the position of the pointer 48, interconnecting arms 54 and 56, and link 57 being suitably provided for the purpose. Any suitable connections may be utilized to translate movements of the Bourdon tube into indicating movements of the pointer, but preferably in the form of the invention shown the pointer operates from a central shaft and the parts are so constructed and arranged as to make possible the central positioning of this shaft.

The construction and operation of the unit shown in Figs. 5 to 7, inclusive, do not differ appreciably from the construction and operation of the unit shown in Figs. 1 to 4, inclusive. The provision of the double calibrated strip on a rounded dial (or on the rounded housing cap itself, if desired), provides for much greater visibility from substantially any portion of the room from which the housewife may wish to inspect the pressure cooker. By utilizing contrasting colors and shades a very clear and easily read dial and pointer combination is produced. Visibility is improved by properly shaping and controlling the thickness of the housing cap 44. Preferably the top wall thereof is made of the uniform thickness so that lens effect is reduced to a minimum. Those skilled in the art will understand that in actual operation the functioning of the device of Figs. 5 to 7, inclusive, may be identical with the functioning of the device of Figs. 1 to 4, inclusive. The devices may be made of any desired weight and size to control, within any practical limits desired, the pressure which may be maintained within the pressure cooker. The release of pressure at the end of a cooking period and other operating features may be as described.

The construction shown in Fig. 8 functionally is generally similar to the previously described constructions but differs in several respects in details which may have some importance. A cover 61 has a tapered plug 62 threaded therein, which plug acts as the support for a combination gauge and pressure relief valve. The plug 62 is provided with a central upwardly extending conical valve 63 adapted to engage in a valve seat 64. The valve seat 64 is formed in a threaded shank 66 extending through a weight forming member 67. The shank 66 is carried by a plate 68 on which a pressure gauge mechanism, generally indicated by the reference character 69, is carried. A gasket 71 is disposed between the weight producing member 67 and the plate 68. By this construction, the gauge mechanism 69 may be made standard to fit various weight forming members 67, whereby the steam pressure at which the completed assembly will be lifted, may be varied. A housing 72 snugly fits the outside of the weight bearing member 67 and a transparent housing cap 73 covers the pressure gauge mechanism 69.

The plug 62 is provided with a central aperture 74 leading to the center of the valve 63 and this aperture is aligned with an aperture 76 extending through the valve seat 64 and through the shank 66 for communication with the gauge mechanism 69. The plug 62 has an exterior annular recess in which a split ring 77 is disposed, this split ring projecting somewhat beyond the periphery of the plug 62 itself, but being capable of being forced inwardly and past a lower annular shoulder 78 on the interior of the weight forming member 67. This combination of the split ring and shoulder performs the same general function as the threaded connection shown in the previous figures; but it differs therefrom in that the entire pressure indicating and pressure relief device may be directly forced into position, the shoulder 78 causing the split ring to be contracted. The split ring expands above the shoulder 78, however, and functions to prevent the pressure relief device from being forced entirely out of contact with the cover when the steam pressure is raised beyond the blow-off pressure.

There are several respects in which the several embodiments described above are identical, and some respects in which they differ. In each instance, the dial and pointer are housed in the transparent portion of the device, and all parts are made of heat resisting material, so that they may readily be grasped in the fingers, even for the purpose of releasing steam pressure. The steam is caused to escape along the cover, i. e., generally along the plane of the cover, and the hands will not be burned. Each device has a recess 40 which traps condensate, and from which condensate may gradually be evaporated. The seat and valve are reversed in Fig. 8, thus securing certain detailed advantages and it will be noted that the valve tip is protected by being placed below the level of the top surface of the plug 62. Other similarities and differences between the several embodiments will be noted.

While the devices of my present invention are intended to and will satisfy all of the requirements of a pressure cooker, with respect to control of pressure and the like, those skilled in the art will understand that the use of the devices of my invention does not preclude the used of additional pressure relief devices if desired for further safety.

I have disclosed many details of several embodiments of my invention, but the scope thereof is defined by the claim.

What I claim as new and desire to protect by Letters Patent of the United States is:

A combination pressure relief and indicating device for a pressure cooker comprising a support member having an annular flange projecting from the surface thereof, a valve seat disposed centrally of said flange, an annular condensation trap and evaporation recess between the said seat and flange, a pressure relief and indicating device frame member having an annular internally extending flange engageable under the support flange and normally axially spaced therefrom to provide for valve movement, and a valve on said frame member disposed centrally of said internally attending flange, said first mentioned flange having vertically disposed steam releasing apertures whereby to release steam from beneath the said frame member in the event said flanges should be in engagement during steam pressure ejectment of said valve from its seat.

CLIFFORD E. IVES.

REFERENCES CITED

The following references are of record in the file of this patent:

UNITED STATES PATENTS

| Number | Name | Date |
|---|---|---|
| 367,324 | Shields | July 26, 1887 |
| 858,131 | Aichele | June 25, 1907 |
| 1,322,324 | Mertens | Nov. 18, 1919 |
| 1,326,124 | Vischer, Jr. | Dec. 23, 1919 |
| 1,369,754 | Nixon | Feb. 22, 1921 |
| 1,515,184 | Waggoner | Nov. 11, 1924 |
| 1,569,187 | Jewell | Jan. 12, 1926 |
| 1,586,273 | Wall | May 25, 1926 |
| 1,820,120 | Collins | Aug. 25, 1931 |
| 1,834,837 | Hashimoto | Dec. 1, 1931 |
| 1,871,984 | Hoffman | Aug. 16, 1932 |
| 1,958,429 | Hartog | May 15, 1934 |
| 1,974,274 | Hopkins | Sept. 18, 1934 |
| 2,164,450 | Eshbaugh et al. | July 4, 1939 |
| 2,166,003 | Green | July 11, 1939 |
| 2,200,903 | Stephens | May 14, 1940 |
| 2,254,570 | Hailey | Sept. 2, 1941 |
| 2,297,378 | Wittenberg | Sept. 29, 1942 |
| 2,308,320 | Stephens | Jan. 12, 1943 |
| 2,340,593 | Illsley | Feb. 1, 1944 |
| 2,428,483 | Wittenberg | Oct. 7, 1947 |

FOREIGN PATENTS

| Number | Country | Date |
|---|---|---|
| 41 | Great Britain | of 1878 |
| 229,837 | Great Britain | Mar. 5, 1925 |